(12) United States Patent
Ogino

(10) Patent No.: US 12,345,681 B2
(45) Date of Patent: Jul. 1, 2025

(54) DISPLAY PROCESS METHOD AND DATA ANALYSIS APPARATUS

(71) Applicant: SHIMADZU CORPORATION, Kyoto (JP)

(72) Inventor: Kota Ogino, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 666 days.

(21) Appl. No.: 17/571,641

(22) Filed: Jan. 10, 2022

(65) Prior Publication Data

US 2022/0236218 A1 Jul. 28, 2022

(30) Foreign Application Priority Data

Jan. 28, 2021 (JP) .................. 2021-011900

(51) Int. Cl.
*G01N 27/00* (2006.01)
*G01N 27/447* (2006.01)
*G06T 11/60* (2006.01)

(52) U.S. Cl.
CPC . *G01N 27/44717* (2013.01); *G01N 27/44747* (2013.01); *G01N 27/44773* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 6,611,768 B2 * | 8/2003 | Gallagher | G01N 27/44717 702/22 |
| 6,616,824 B1 * | 9/2003 | Tanaka | G01N 27/44721 204/603 |
| 2003/0142094 A1 * | 7/2003 | Zhang | G16B 40/30 345/440 |

(Continued)

FOREIGN PATENT DOCUMENTS

| | | |
|---|---|---|
| CN | 101437098 A | 5/2009 |
| CN | 102347016 A | 2/2012 |

(Continued)

OTHER PUBLICATIONS

Office Action issued Mar. 5, 2024 in Japanese Application No. 2021-011900.

(Continued)

*Primary Examiner* — Martin Mushambo
(74) *Attorney, Agent, or Firm* — Sughrue Mion, PLLC

(57) ABSTRACT

A display process method, a data analysis apparatus, and a program are provided that allow a plurality of pieces of data obtained after an analysis to be readily rearranged and displayed. The display process method includes: acquiring the plurality of pieces of data from a data file; arranging and displaying a plurality of gel images in a predetermined order, the plurality of gel images corresponding to the acquired plurality of respective pieces of data; making an inquiry to a user as to whether or not to rearrange and display the plurality of gel images in order of display, the order of display being different from the predetermined order; and rearranging and displaying the plurality of gel images in the order of display.

10 Claims, 16 Drawing Sheets

(56) References Cited

U.S. PATENT DOCUMENTS

| | | | |
|---|---|---|---|
| 2004/0027350 A1* | 2/2004 | Kincaid | G06T 11/206 345/440 |
| 2004/0061702 A1* | 4/2004 | Kincaid | G16B 25/10 345/440 |
| 2005/0002065 A1* | 1/2005 | Kotaka | H04N 1/00411 358/440 |
| 2006/0006066 A1* | 1/2006 | Yamazaki | G01N 27/44743 204/601 |
| 2006/0028471 A1* | 2/2006 | Kincaid | G06T 11/206 345/440 |
| 2007/0280546 A1* | 12/2007 | Kwak | H04N 13/398 348/E13.071 |
| 2008/0080049 A1* | 4/2008 | Hamagishi | H04N 13/317 348/E13.043 |
| 2009/0122336 A1 | 5/2009 | Honma | |
| 2009/0241023 A1* | 9/2009 | Suzuki | G07B 15/00 715/273 |
| 2011/0144923 A1* | 6/2011 | Gallagher | G01N 30/8651 702/32 |
| 2012/0026193 A1 | 2/2012 | Higeta | |
| 2014/0055429 A1* | 2/2014 | Kwon | G06F 1/1652 345/204 |
| 2017/0162102 A1* | 6/2017 | Liu | G09G 3/2074 |
| 2017/0253882 A1* | 9/2017 | Liu | C07K 14/43522 |
| 2018/0217093 A1* | 8/2018 | Arai | G01N 27/44717 |
| 2020/0043162 A1* | 2/2020 | Kumagai | G01N 27/44756 |
| 2020/0103372 A1* | 4/2020 | Asogawa | G16B 5/00 |
| 2020/0142912 A1* | 5/2020 | Harada | G16C 20/70 |
| 2020/0408792 A1 | 12/2020 | Kumagai et al. | |
| 2021/0231608 A1* | 7/2021 | Kumagai | G01N 27/44791 |

FOREIGN PATENT DOCUMENTS

| | | |
|---|---|---|
| CN | 105424785 A | 3/2016 |
| CN | 110100282 A | 8/2019 |
| CN | 110794025 A | 2/2020 |
| CN | 111141806 A | 5/2020 |
| CN | 112130717 A | 12/2020 |
| JP | 2004-133903 A | 4/2004 |
| JP | 2020-020725 A | 2/2020 |
| JP | 2020-076613 A | 5/2020 |
| WO | 2018/168722 A1 | 9/2018 |

OTHER PUBLICATIONS

Communication issued Nov. 27, 2024 in Chinese Application No. 202210101298.X.

Chinese Office Action dated Apr. 17, 2025 in Application No. 202210101298.X.

* cited by examiner

DATA ANALYZED IN ORDER IN HORIZONTAL DIRECTION
(IN ASCENDING ORDER OF ROW PRECEDENCE)

| ORDER OF ARRANGEMENT | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| ORDER OF ANALYSIS | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| WELL | X1 | X1 | X1 | X1 | A2 | A3 | A4 | A5 | A6 | A7 | B2 | B3 | B4 | B5 | B6 | B7 | C2 | C3 | C4 | C5 | C6 | C7 |

AFTER REARRANGEMENT IN ORDER IN VERTICAL DIRECTION
(IN ASCENDING ORDER OF COLUMN PRECEDENCE)

| ORDER OF ARRANGEMENT | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| ORDER OF ANALYSIS | 1 | 2 | 3 | 4 | 5 | 11 | 17 | 6 | 12 | 18 | 7 | 13 | 19 | 8 | 14 | 20 | 9 | 15 | 21 | 10 | 16 | 22 |
| WELL | X1 | X1 | X1 | X1 | A2 | B2 | C2 | A3 | B3 | C3 | A4 | B4 | C4 | A5 | B5 | C5 | A6 | B6 | C6 | A7 | B7 | C7 |

DATA ANALYZED IN ORDER IN VERTICAL DIRECTION
(IN ASCENDING ORDER OF COLUMN PRECEDENCE)

| ORDER OF ARRANGEMENT | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| ORDER OF ANALYSIS | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| WELL | X1 | X1 | X1 | X1 | A2 | B2 | C2 | A3 | B3 | C3 | A4 | B4 | C4 | A5 | B5 | C5 | A6 | B6 | C6 | A7 | B7 | C7 |

AFTER REARRANGEMENT IN ORDER IN HORIZONTAL DIRECTION
(IN ASCENDING ORDER OF ROW PRECEDENCE)

| ORDER OF ARRANGEMENT | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| ORDER OF ANALYSIS | 1 | 2 | 3 | 4 | 5 | 8 | 11 | 14 | 17 | 20 | 6 | 9 | 12 | 15 | 18 | 21 | 7 | 10 | 13 | 16 | 19 | 22 |
| WELL | X1 | X1 | X1 | X1 | A2 | A3 | A4 | A5 | A6 | A7 | B2 | B3 | B4 | B5 | B6 | B7 | C2 | C3 | C4 | C5 | C6 | C7 |

FIG.12
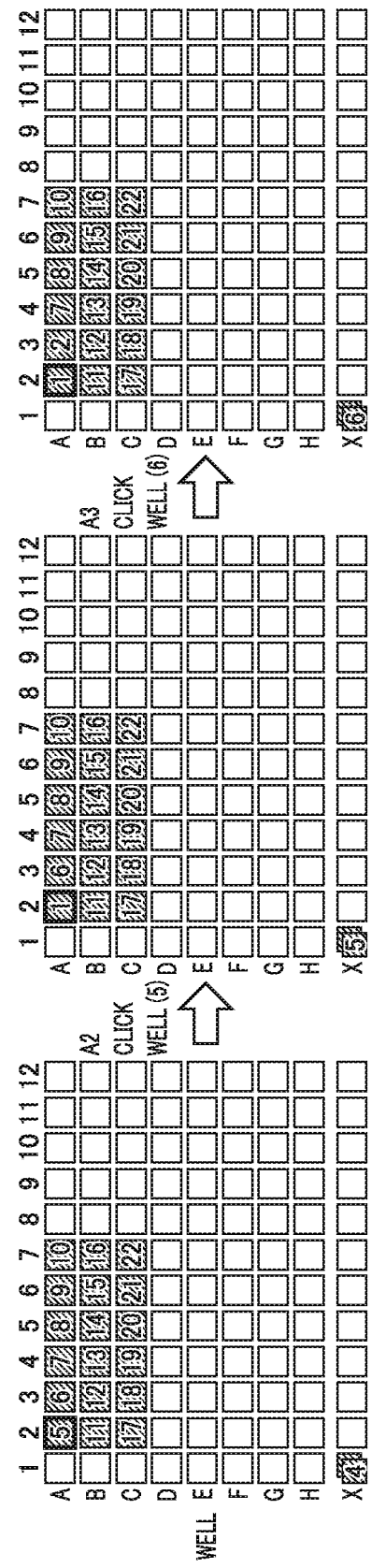
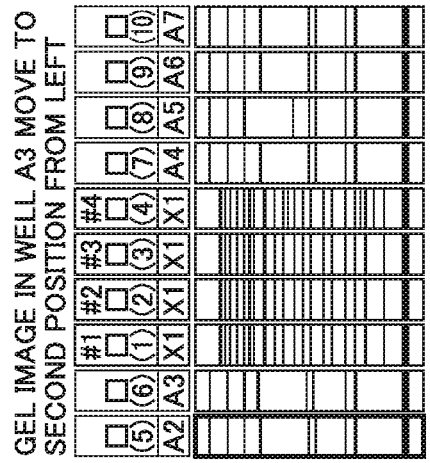
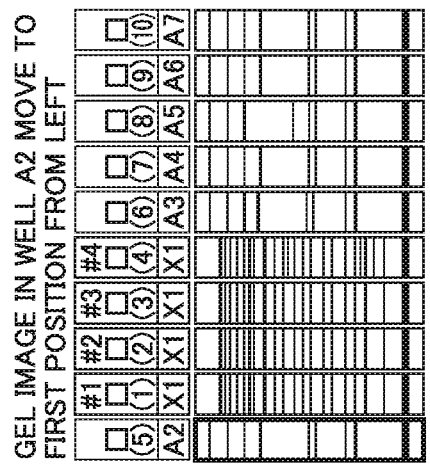
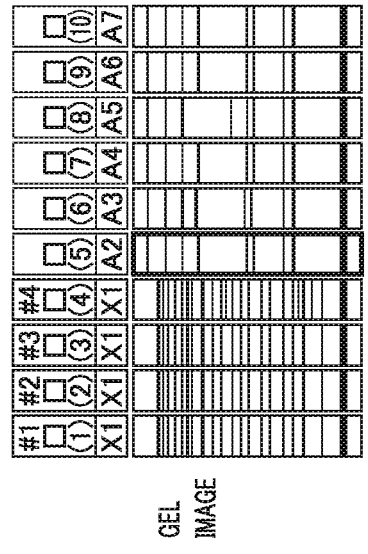

DISPLAY PROCESS METHOD AND DATA ANALYSIS APPARATUS

BACKGROUND OF THE INVENTION

Field of the Invention

The present disclosure relates to a display process method and a data analysis apparatus.

Description of the Background Art

In the case of software for analyzing and displaying electrophoretic data, conventionally, detected data has been displayed in the form of an electropherogram and a gel image.

Japanese Patent Laying-Open No. 2020-20725 discloses an example of a data analysis apparatus that analyzes data of samples separated by electrophoresis and is configured to display detected data in the form of the above-mentioned electropherogram and gel image.

SUMMARY OF THE INVENTION

In general, a data analysis apparatus displays gel images in order in which samples have been analyzed. However, there is a need to rearrange gel images in the order different from the order of analysis after data of a lot of samples has been acquired by an analysis apparatus that automatically analyzes electrophoresis separation and the like. Conventionally, such rearrangement has required user's time and effort, and therefore, rearrangement of gel images could not be easily done. This sometimes resulted in waste operations such as conducting an analysis again.

An object of the present disclosure is to provide a display process method and a data analysis apparatus that allow a plurality of pieces of data obtained after an analysis to be readily rearranged and displayed.

A first aspect of the present disclosure relates to a display process method for a plurality of pieces of data each obtained by electrophoresis separation for a corresponding one of a plurality of samples. The display process method includes: acquiring the plurality of pieces of data from a data file; arranging and displaying a plurality of gel images in a predetermined order, the plurality of gel images corresponding to the acquired plurality of respective pieces of data; making an inquiry to a user as to whether or not to rearrange and display the plurality of gel images in order of display, the order of display being different from the predetermined order; and rearranging and displaying the plurality of gel images in the order of display.

According to the display process method and the data analysis apparatus in the present disclosure, based on an instruction from the user, gel images can be rearranged and displayed in order of display different from the predetermined order. Accordingly, evaluation after analysis can be readily conducted, and thus, waste operations such as conducting an analysis again can be eliminated.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a diagram for illustrating designation of the order of arrangement by clicking.

DESCRIPTION OF THE PREFERRED EMBODIMENTS

Figure 1:
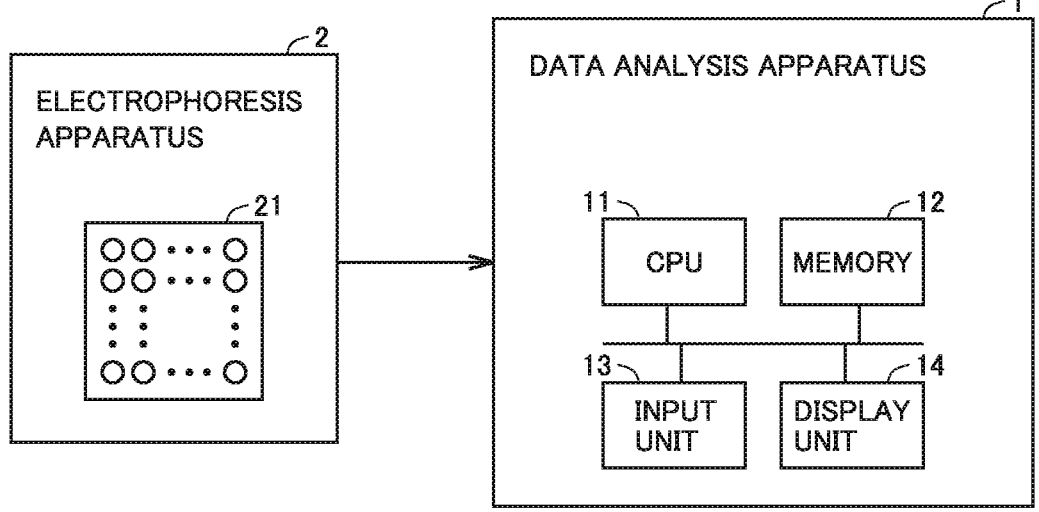
FIG. 1 is a diagram showing an overall configuration of an analysis system.

Embodiments of the present invention will be hereinafter described in detail with reference to the accompanying drawings, in which the same or corresponding components are denoted by the same reference characters, and description thereof will not be repeated.

FIG. 1 is a diagram showing the overall configuration of an analysis system. As shown in FIG. 1, analysis system 100 includes a data analysis apparatus 1 and an electrophoresis apparatus 2.

Electrophoresis apparatus 2 automatically and continuously analyzes a plurality of samples set on a plate 21 in which wells are formed in rows and columns. From electrophoresis apparatus 2, data analysis apparatus 1 acquires separation data obtained by electrophoresis, and then, performs a data analysis process.

Data analysis apparatus 1 includes a central process unit (CPU) 11, a memory 12 (a read only memory (ROM), a random access memory (RAM), and a non-volatile memory), an input unit 13, and a display unit 14. Input unit 13 includes, for example, a keyboard, a mouse, and the like. Display unit 14 includes a liquid crystal display and the like. CPU 11 expands a program stored in an ROM and then executes the expanded program on a RAM or the like. The program stored in the ROM describes a process procedure of data analysis apparatus 1. The non-volatile memory stores data, which has been sent from electrophoresis apparatus 2, as a data file. Note that memory 12 may include a hard disk device in place of or in addition to a non-volatile memory. According to the program describing the process procedure, data analysis apparatus 1 generates data to be displayed and causes display unit 14 to display the data. Such control is not limited to processing by software but can also be processed by dedicated hardware (an electronic circuit).

Figure 2:
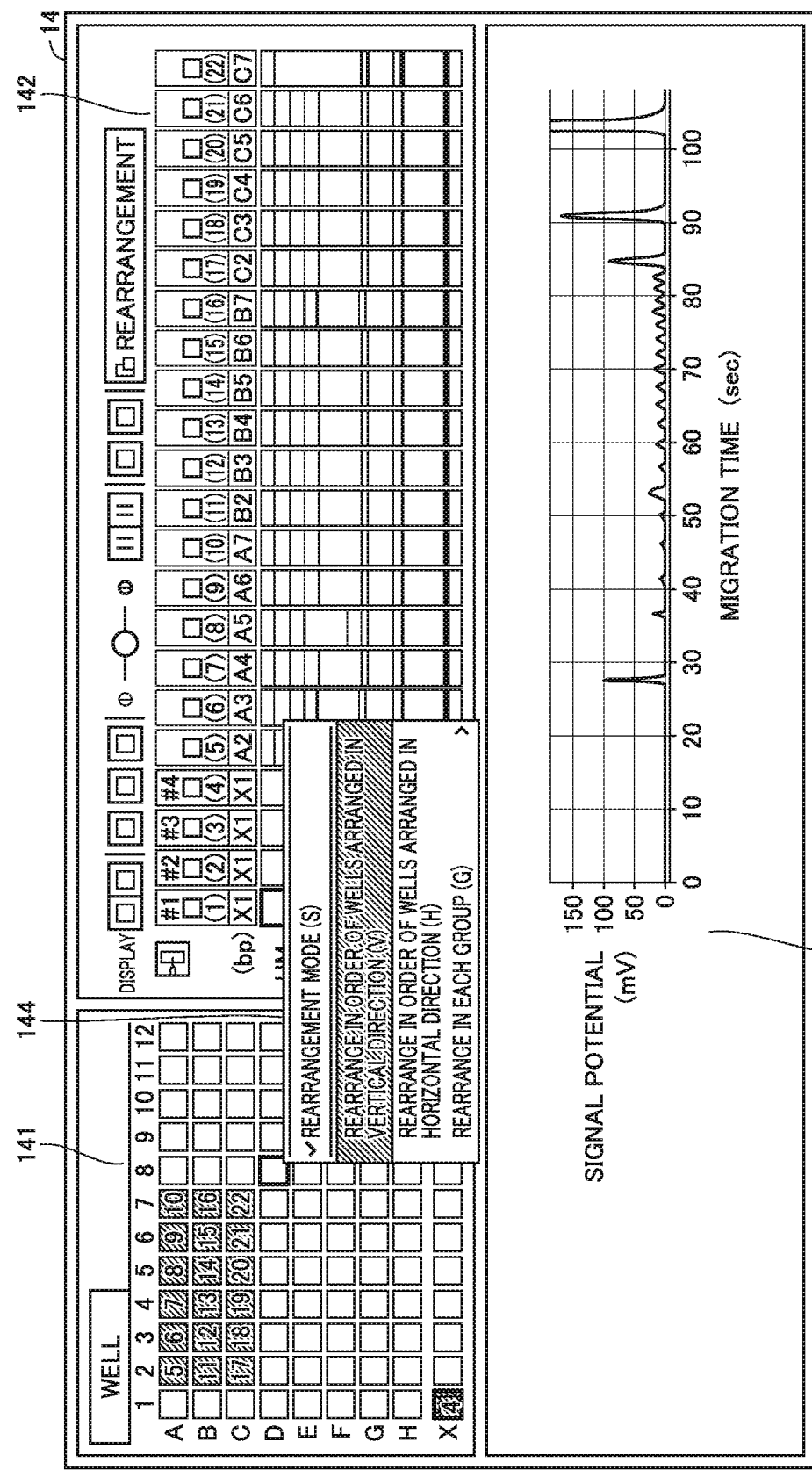
FIG. 2 is a diagram showing an example of a screen displayed on a display unit 14.

FIG. 2 is a diagram showing an example of a screen displayed on display unit 14. Display unit 14 shows windows 141 to 144.

Window 141 shows an image corresponding to the arrangement of wells in rows and columns formed in plate 21 in FIG. 1. Window 142 shows an arrangement of gel images of a plurality of samples side by side. Window 143 shows an electropherogram of one of the samples.

The electropherogram is produced based on the separation data obtained in electrophoresis apparatus 2. For example, when a sample is deoxyribonucleic acid (DNA) and electrophoresis apparatus 2 performs gel electrophoresis, an electropherogram is produced in which the horizontal axis represents the migration time (sec) and the vertical axis represents the signal intensity (mV). In the electropherogram in FIG. 2, components separated by electrophoresis appear as peaks of about 22.

Each of the gel images represents an electropherogram of each of the samples in a simple representation. Each gel image shows a plurality of stripes. The concentration of each stripe can be determined from the area shown by the peak waveform of each component of the electropherogram.

Window 144 shows a rearrangement menu popped up on display unit 14 by a user's operation. In the example in FIG. 2, a rearrangement mode is being selected.

In this case, the user can select one of three menus of: "rearrange in order of wells arranged in vertical direction (the column direction)"; "rearrange in order of wells arranged in horizontal direction (the row direction)"; and "rearrange in each group".

Window 141 shows a total of 108 wells (i.e., 108=12×9, specifically, the first to twelfth columns, and A to H and X rows). The numbers displayed in respective wells represent the order of arrangement of the wells and indicate at what number of gel images in window 142 each well is displayed. As an example of usage, unknown samples undergoing electrophoresis may be placed in 96 wells of rows A to H (8 rows)×12 columns while known samples to be compared with these unknown samples may be placed in row X (1 row)×12 columns.

The data file read into data analysis apparatus 1 includes information about the position of the well of each sample, the order of analysis, and the order of arrangement of gel images.

In the example in FIG. 2, a well X1, wells A2 to A7, wells B2 to B7, and wells C2 to C7 are used in the data file read into data analysis apparatus 1. In window 142 that shows gel images, the order of analysis is shown as (1) to (22), below which the positions of the respective wells are shown. In the present example, a device capable of conducting electrophoresis of four samples in one analysis is used. A reference sample is arranged in well X1. In the first analysis, the sample in the same well X1 is dripped on each of four electrophoresis channels and then analyzed. Thus, the same well X1 is shown below the order of analysis of (1) to (4).

When the data file is read and the data not particularly undergoing rearrangement is obtained, gel images are arranged in order of analysis of (1) to (22) in window 142 since data analysis apparatus 1 is set to conduct an analysis in order of arrangement.

Figure 3:
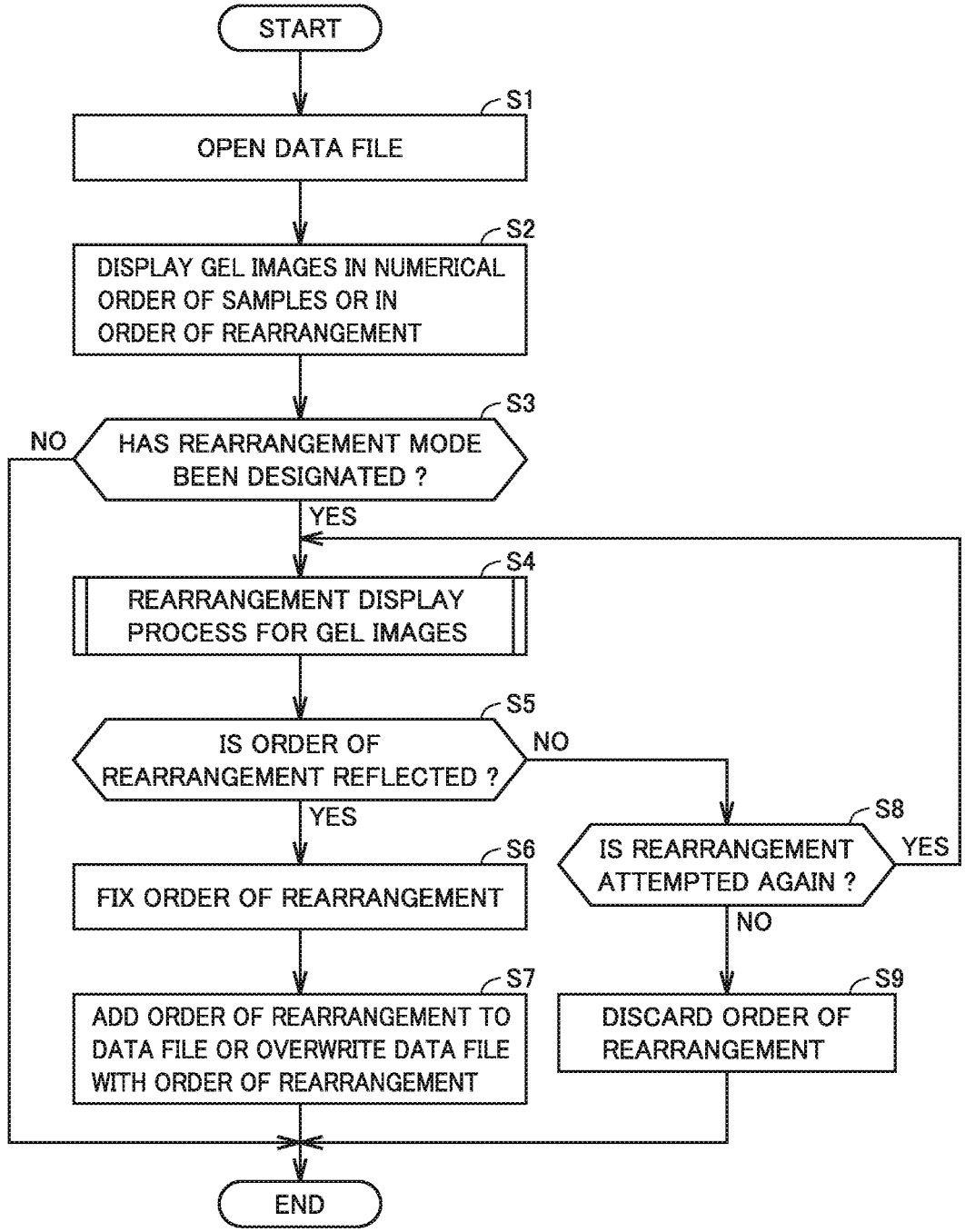
FIG. 3 is a flowchart for illustrating a display process of a data analysis apparatus.

FIG. 3 is a flowchart for illustrating a display process of the data analysis apparatus. First, in step S1, CPU 11 opens a data file stored in memory 12. Then, in step S2, a gel image is displayed in window 142 as shown in the example in FIG. 2. If not particularly designated, CPU 11 arranges the gel images in numerical order of samples (the order of analysis) and causes display unit 14 to show the arranged gel images. On the other hand, when the order of rearrangement is stored in the data file, CPU 11 rearranges the gel images in order of rearrangement stored in the data file and causes display unit 14 to show the rearranged gel images. In many cases, electrophoresis apparatus 2 is capable of simultaneously analyzing a plurality of samples in one analysis. For example, even when electrophoresis apparatus 2 has four electrophoresis channels and simultaneously analyzes four samples in one analysis, the order of analysis is set differently for these four samples as appropriate. Thus, in the present specification, the order of analysis is also referred to as numerical order of samples.

Then, in step S3, CPU 11 determines whether the rearrangement mode has been designated or not. For example, when the user uses input unit 13 (for example, a mouse) to select a rearrangement button displayed in window 142, CPU 11 determines that the rearrangement mode has been designated.

Then, CPU 11 performs a rearrangement display process for gel images. The rearrangement display process allows the user to select a desired rearrangement from a menu display. Details of the rearrangement display process will be described later with reference to FIG. 4 and subsequent figures.

After the rearrangement display process is performed, then in step S5, CPU 11 makes an inquiry to the user as to whether or not to reflect the order of rearrangement.

When the order of rearrangement is reflected (YES in S5), then in step S6, CPU 11 fixes the order of arrangement that occurs after conducting the rearrangement desired by the user. Then, in step S7, CPU 11 adds the order of rearrangement to the data file or overwrites the data file with the order of rearrangement. When no rearrangement has been conducted, the order of rearrangement is added to the data file since the order of arrangement is set in order of analysis as a default. Further, when the rearrangement has already been conducted, the order of arrangement recorded in the data file is overwritten with the order of arrangement that occurs after the rearrangement conducted in step S4.

On the other hand, when the order of rearrangement is not reflected (NO in S5), then in step S8, CPU 11 makes an inquiry to the user as to whether or not to attempt rearrangement again. When rearrangement is attempted again (YES in S8), CPU 11 repeats the process from step S4 and the subsequent steps again. When rearrangement is not attempted again (NO in S8), then in step S9, CPU 11 discards the order of arrangement obtained after rearrangement in step S4, and then, ends the process. In this way, in the analysis apparatus according to the present embodiment, the order of rearrangement is stored in the data file, so that the order of rearrangement and the order of analysis (the numerical order of samples) can be freely switched in displaying the gel images.

[Rearrangement Mode (Rearrangement between Vertical Direction and Horizontal Direction)]

In plate 21 shown in FIG. 1, a large number of wells arranged in rows and columns are disposed. In the case where there are a large number of samples to be continuously measured, the user may often change the content of the sample in each row or each column.

For example, when there are 96 wells of 8 rows×12 columns in which unknown samples undergoing electrophoresis are arranged in the respective wells, it is often meaningful to an experimenter in what manner the samples are arranged in these 96 wells (in the vertical direction/in the horizontal direction).

For example, in the case where a sample for an experiment condition A is placed in the first column and a sample for an experiment condition B is placed in the second column, the analysis should be conducted in order in the vertical direction (in order in the column direction). However, when the experimenter analyzes the samples erroneously in order in the horizontal direction (in order in the row direction), the images under experiment conditions A and B are alternately displayed as gel images.

For example, when three study groups share one analysis apparatus and perform their respective analyses in an overnight operation, the first group uses a row A, the second group uses a row B, the third group uses a row C, and the like. In this way, it is assumed that a row direction is adapted for analysis.

Conversely, the first group uses the second column, the second group uses the third column, the third group uses the fourth column, the fourth group uses the fifth column, the fifth group uses the sixth column, the sixth group uses the seventh column, and the like. In this way, it is also assumed that a column direction is adapted for analysis.

The method to be adapted varies depending on the research facility, constituent members of the study group, and the like. It is also conceivable that a plate employed in a method adapting a row direction and a plate employed in a method adapting a column direction may coexist. In such a case, it is convenient if rearrangement can be conducted in a simple operation, for example, by arranging and displaying gel images in ascending order of row precedence even when performing an analysis in ascending order of column precedence, or by arranging and displaying gel images in ascending order of column precedence even when performing an analysis in ascending order of row precedence.

In particular, it is significantly convenient that gel images arranged in order of wells arranged in the vertical direction are collectively rearranged in order of wells arranged in the horizontal direction, or that gel images arranged in order of wells arranged in the horizontal direction are collectively rearranged in order of wells arranged in the vertical direction.

Figure 4:
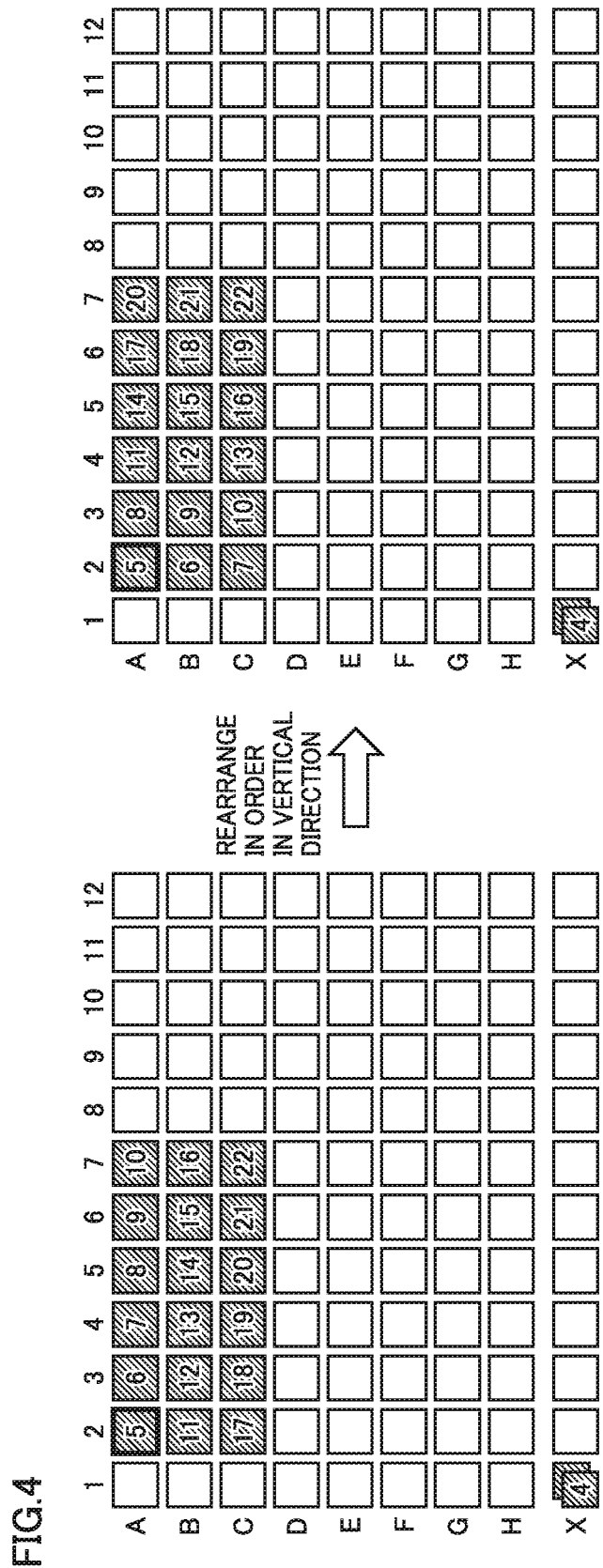
FIG. 4 is a diagram showing the order of arrangement of wells before and after the wells arranged in order in a horizontal direction are rearranged in order in a vertical direction.
Figure 5:
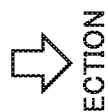
FIG. 5 is a diagram showing the order of arrangement of gel images before and after the gel images arranged in order in the horizontal direction are rearranged in order in the vertical direction.

FIG. 4 is a diagram showing the order of arrangement of wells before and after the wells arranged in order in the horizontal direction are rearranged in order in the vertical direction. FIG. 4 shows the contents displayed in window 141 in FIG. 2. FIG. 5 is a diagram showing the order of arrangement of gel images before and after the gel images arranged in order in the horizontal direction are rearranged in order in the vertical direction. FIG. 5 shows the contents displayed in window 142 in FIG. 2. In FIG. 5, gel images may actually be shown below the representation of the wells as shown in FIG. 2, but are not shown in FIG. 5.

Before rearrangement, the first four images are gel images of reference samples arranged in respective wells X1; the fifth to tenth images in order of arrangement are gel images of the samples arranged in respective wells A2 to A7; the eleventh to sixteenth images in order of arrangement are gel images of the samples arranged in respective wells B2 to B7; and the seventeenth to twenty-second images in order of arrangement are gel images of the samples arranged in respective wells C2 to C7.

When the user selects a menu of "rearrange in order of wells arranged in vertical direction" in window 144 in FIG. 2 in the state where the gel images are shown as described above, rearrangement in order in the vertical direction (in ascending order of column precedence) is conducted.

As a result, the first four images remain as gel images of the reference samples arranged in respective wells X1, but the order of display of the gel images corresponding to the respective wells in which a plurality of samples are arranged in rows and columns is rearranged as follows.

The fifth, sixth, and seventh images in order of arrangement are gel images of the samples arranged in wells A2, B2, and C2, respectively; the eighth, ninth, and tenth images in order of arrangement are gel images of the samples arranged in wells A3, B3, and C3, respectively; and the eleventh, twelfth, and thirteenth images in order of arrangement are gel images of the samples arranged in wells A4, B4, and C4, respectively.

Further, the fourteenth, fifteenth, and sixteenth images in order of arrangement are gel images of the samples arranged in wells A5, B5, and C5, respectively; the seventeenth, eighteenth, and nineteenth images in order of arrangement are gel images of the samples arranged in wells A6, B6, and C6, respectively; and the twentieth, twenty-first, and twenty-second images in order of arrangement are gel images of the samples arranged in wells A7, B7, and C7, respectively.

Figure 6:
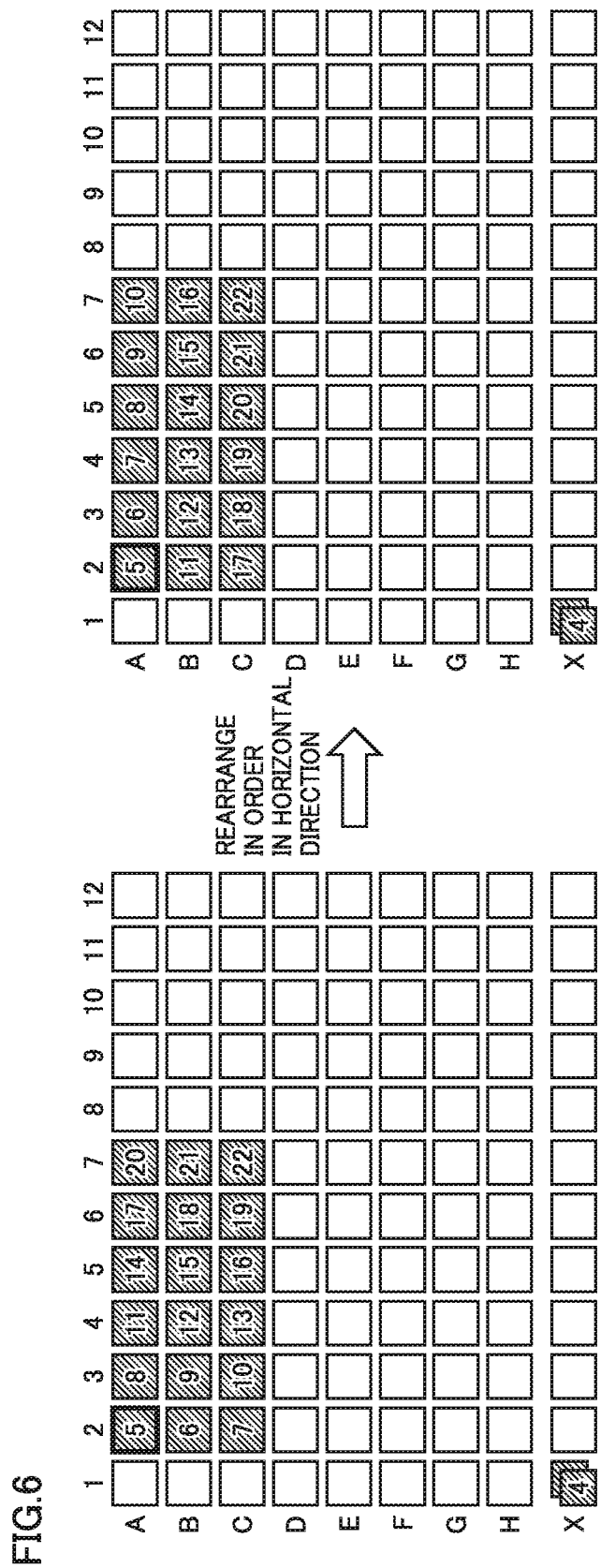
FIG. 6 is a diagram showing the order of arrangement of wells before and after the wells arranged in order in the vertical direction are rearranged in order in the horizontal direction.
Figure 7:
FIG. 7 is a diagram showing the order of arrangement of gel images before and after the gel images arranged in order in the vertical direction are rearranged in order in the horizontal direction.

FIG. 6 is a diagram showing the order of arrangement of wells before and after the wells arranged in order in the vertical direction are rearranged in order in the horizontal direction. FIG. 6 shows the contents displayed in window 141 in FIG. 2. FIG. 7 is a diagram showing the order of arrangement of gel images before and after the gel images arranged in order in the vertical direction are rearranged in order in the horizontal direction. FIG. 7 shows the contents displayed in window 142 in FIG. 2. In FIG. 7, gel images may actually be shown below the representation of the wells as shown in FIG. 2, but are not shown in FIG. 7.

Before rearrangement, the first four images are gel images of the reference samples arranged in respective wells X1; the fifth, sixth, and seventh images in order of arrangement are gel images of the samples arranged in wells A2, B2, and C2, respectively; the eighth, ninth, and tenth images in order of arrangement are gel images of the samples arranged in wells A3, B3, and C3, respectively; and the eleventh, twelfth, and thirteenth in order of arrangement are gel images of the samples arranged in wells A4, B4, and C4, respectively.

Further, the fourteenth, fifteenth, and sixteenth images in order of arrangement are gel images of the samples arranged in wells A5, B5, and C5, respectively; the seventeenth, eighteenth, and nineteenth images in order of arrangement are gel images of the samples arranged in wells A6, B6, and C6, respectively; and the twentieth, twenty-first, and twenty-second images in order of arrangement are gel images of the samples arranged in wells A7, B7, and C7, respectively.

When the user selects a menu of "rearrange in order of wells arranged in horizontal direction" in window 144 in FIG. 2 in the state where the gel images are shown as described above, rearrangement in order in the horizontal direction (in ascending order of row precedence) is conducted.

As a result, the first four images remain as gel images of the reference samples arranged in respective wells X1, but the order of display of the gel images corresponding to the respective wells in which a plurality of samples are arranged in rows and columns is rearranged as follows.

The fifth to tenth images in order of arrangement are gel images of samples arranged in respective wells A2 to A7; the eleventh to sixteenth images in order of arrangement are gel images of samples arranged in respective wells B2 to B7; and the seventeenth to twenty-second images in order of arrangement are gel images of samples arranged in respective wells C2 to C7.

Figure 8:
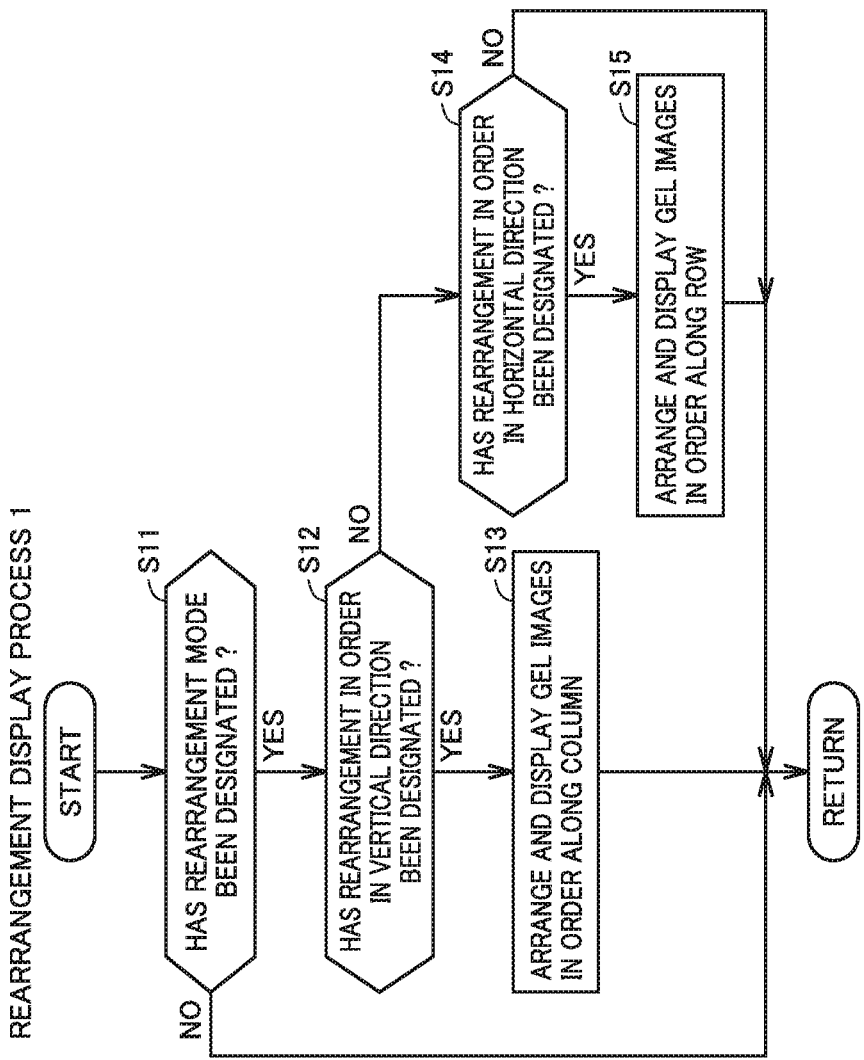
FIG. 8 is a flowchart for illustrating a process of conducting rearrangement in the horizontal direction or the vertical direction.

FIG. 8 is a flowchart for illustrating a process of conducting rearrangement in the horizontal direction or the vertical direction. First, in step S11, CPU 11 determines whether the rearrangement mode has been designated or not. For example, when a rearrangement button corresponding to window 142 has been selected, CPU 11 determines that the rearrangement mode has been selected.

When the rearrangement mode has been selected (YES in S11), then in step S12, CPU 11 determines whether rearrangement in order in the vertical direction has been designated or not. For example, when "rearrange in order of wells arranged in vertical direction" in window 144 has been selected, CPU 11 determines that the rearrangement in order in the vertical direction has been designated.

When rearrangement in order in the vertical direction has been designated (YES in S12), then in step S13, CPU 11 arranges the gel images in ascending order of column precedence and displays window 142 again, as described with reference to FIGS. 4 and 5.

When rearrangement in order in the vertical direction has not been designated (NO in S12), CPU 11 determines in step S14 whether rearrangement in order in the horizontal direction has been designated or not. For example, when "rearrange in order of wells arranged in horizontal direction" in window 144 has been selected, CPU 11 determines that rearrangement in order in the horizontal direction has been designated.

When rearrangement in order in the horizontal direction has been designated (YES in S14), then in step S15, CPU 11 arranges the gel images in ascending order of row precedence and displays window 142 again, as described with reference to FIGS. 6 and 7.

As described above, in the rearrangement mode, rearrangement between the ascending order of row precedence and the ascending order of column precedence can be conducted in a simple operation, and the result can also be stored in the data file. Therefore, even when the state in which the samples are grouped and arranged in respective wells in plate 21 does not match with the order of analysis, the gel images can be immediately rearranged and displayed in the easily viewable order, which is convenient for the user.

[Rearrangement Mode (Drag and Drop)]

The following describes a drag-and-drop operation as another example of the rearrangement process.

Figure 9:
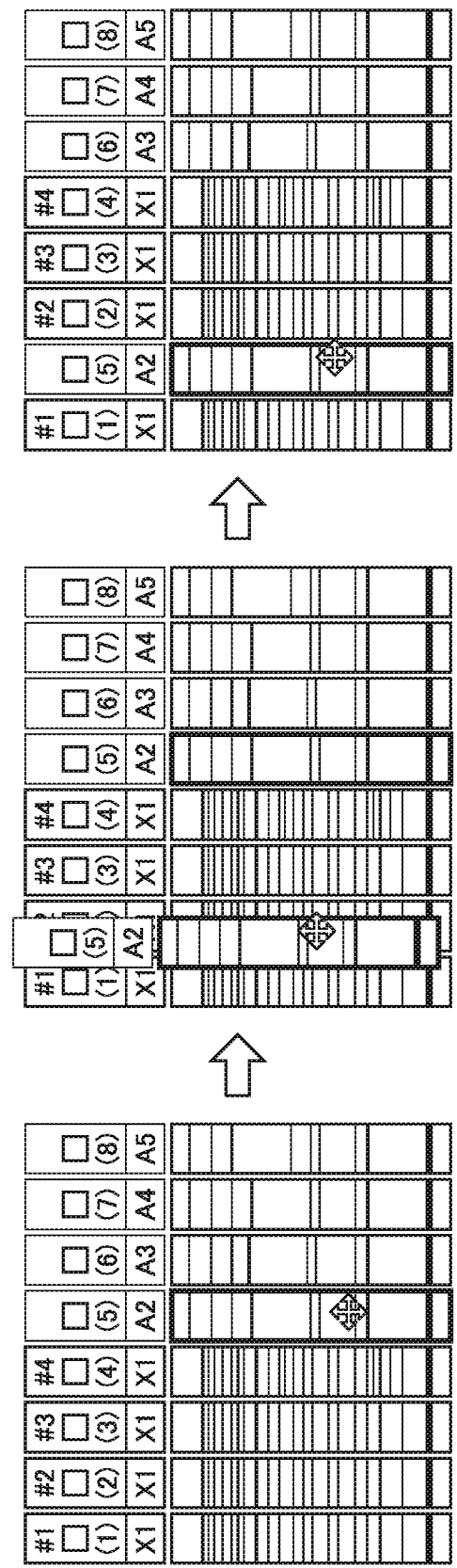
FIG. 9 is a diagram for illustrating rearrangement by a drag-and-drop operation.

FIG. 9 is a diagram for illustrating rearrangement by a drag-and-drop operation. FIG. 9 shows the state where the gel image in the fifth well A2 in order of arrangement is selected by a mouse or the like, dragged to the second well in order of arrangement at the destination, and then dropped onto the destination. As a result, "1" is added to the order of arrangement of the second to fourth wells. Thus, the second, third, and fourth wells in order of arrangement are then translated to the third, fourth, and fifth wells, respectively, in order of arrangement.

Figure 10:
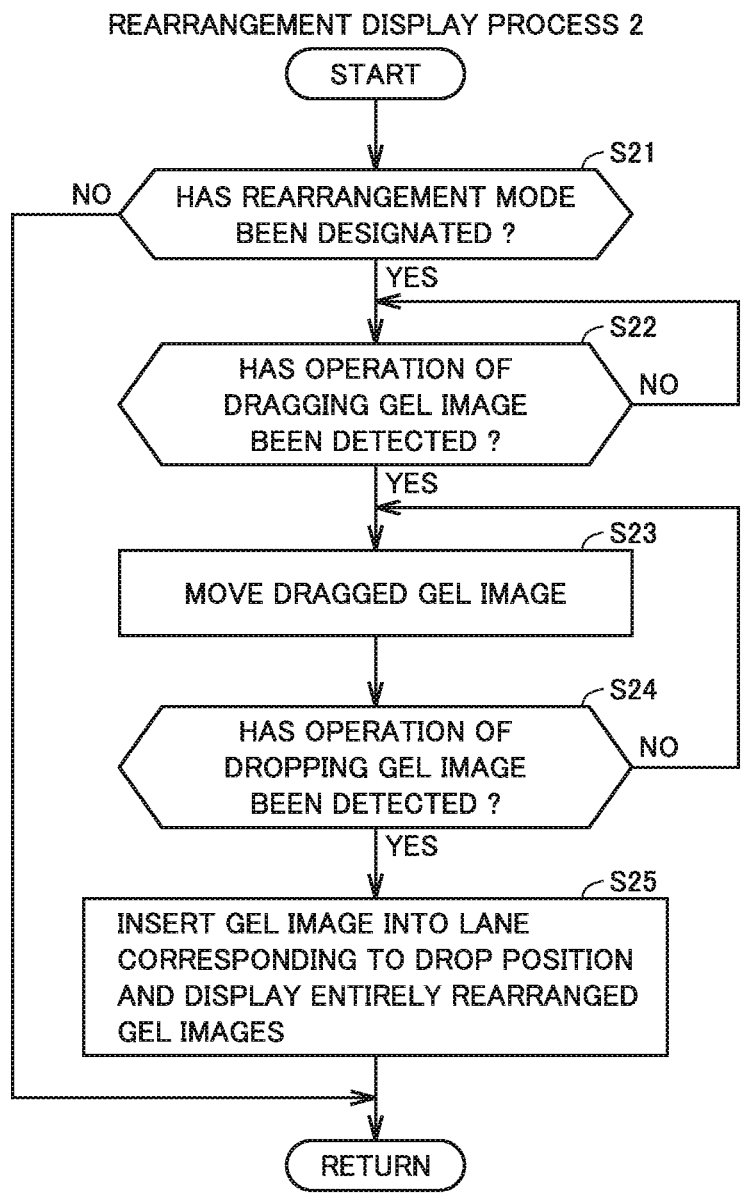
FIG. 10 is a flowchart for illustrating a rearrangement process by the drag-and-drop operation.

FIG. 10 is a flowchart for illustrating a rearrangement process by a drag-and-drop operation. First, in step S21, CPU 11 determines whether the rearrangement mode has been designated or not. For example, when a rearrangement button corresponding to window 142 has been selected, CPU 11 determines that the rearrangement mode has been selected.

When the rearrangement mode has been selected (YES in S21), CPU 11 determines in step S22 whether the operation of dragging a gel image has been detected or not. When the dragging operation has been detected, then in step S23, CPU 11 moves the dragged gel image according to the mouse operation. Then in step S24, CPU 11 determines whether the operation of dropping the gel image has been detected or not. When the dropping operation has not been detected (NO in S24), CPU 11 repeats the process from step S23.

When the dropping operation has been detected (YES in S24), then in step S25, CPU 11 inserts the gel image into a lane corresponding to the drop position, and displays the entirely rearranged gel images.

As described above, the CPU performs the rearrangement process by such dragging and dropping as shown in FIG. 9. Such rearrangement is convenient, for example, when gel images of two samples are displayed adjacent to each other for visual comparison. In the rearrangement by the drag-and-drop operation, the user can intuitively rearrange gel images.

Figure 11:
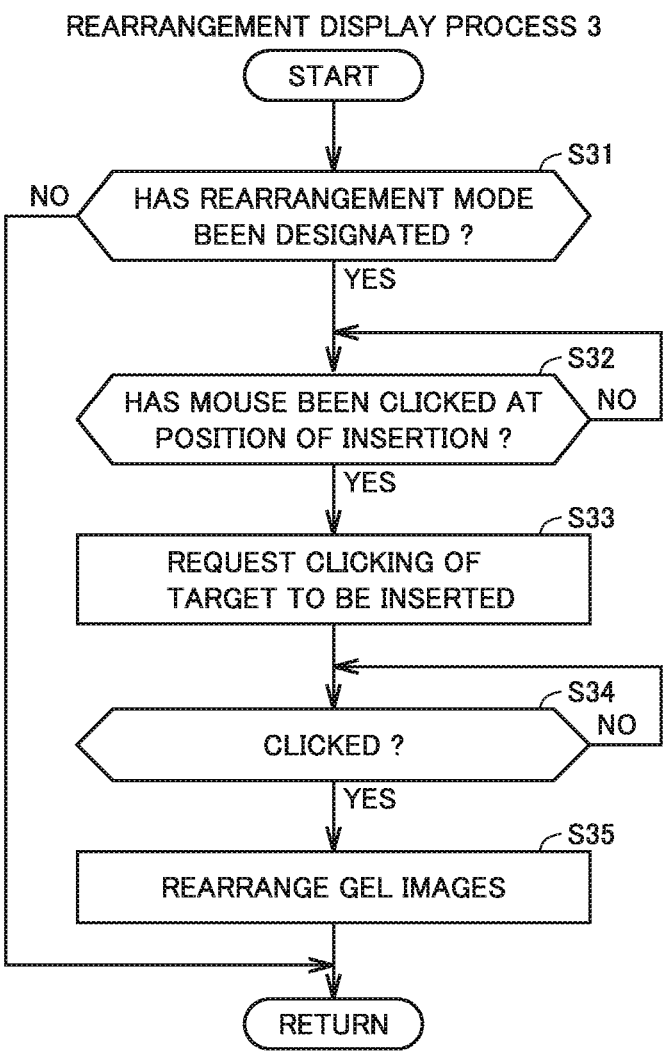
FIG. 11 is a flowchart for illustrating a rearrangement process by an operation of clicking a well.

Similar rearrangement can be done without performing such a drag-and-drop operation. FIG. 11 is a flowchart for illustrating a rearrangement process by an operation of clicking a well. First, in step S31, CPU 11 determines whether the rearrangement mode has been designated or not. For example, when a rearrangement button corresponding to window 142 has been selected, CPU 11 determines that the rearrangement mode has been selected.

When the rearrangement mode has been selected (YES in S31), then in step S32, CPU 11 detects whether a mouse has been clicked or not at the position where the gel image is to be inserted after the movement. When it is detected that a mouse has been clicked (YES in S32), then in step S33, CPU 11 requests clicking of a mouse for designating a gel image to be moved and inserted.

When it is detected that a mouse has been clicked (YES in S34), then in step S35, CPU 11 rearranges the gel images in window 142 and displays the rearranged gel images again.

The process as described above also allows rearrangement similar to that achieved in the drag-and-drop process described with reference to FIGS. 9 and 10. Note that selection of the destination in step S32 and selection of the target to be moved in step S34 may be exchanged in order.

[Designation of Order of Arrangement by Clicking]

Rearrangement by a drag-and-drop operation requires a significant movement of a mouse pointer on a screen, and also, the method by an operation of clicking a well shown in FIG. 11 also takes time and effort since it requires designation of the destination each time. Thus, it is also conceivable to rearrange the gel images one after another in order in which target positions corresponding to the respective gel images are clicked.

FIG. 12 is a diagram for illustrating designation of the order of arrangement by clicking. The following describes designation of the order of arrangement by clicking a well.

When the mouse is clicked at the position of well A2 (the order of analysis 5) in window 141 in the first operation, the gel image corresponding to well A2 is moved from the fifth position to the first position in window 142, and then, each of the gel images in order of analysis of (1) to (4) is shifted by one to the right.

When the mouse is clicked at the position of well A3 (the order of analysis 6) in window 141 in the second operation, the gel image corresponding to well A3 is moved from the sixth position to the second position in window 142, and then, each of the gel images in order of analysis of (1) to (4) is further shifted by one to the right.

In this way, the order of arrangement of the plurality of gel images can be changed by a click operation simpler than a drag-and-drop operation.

Figure 13:
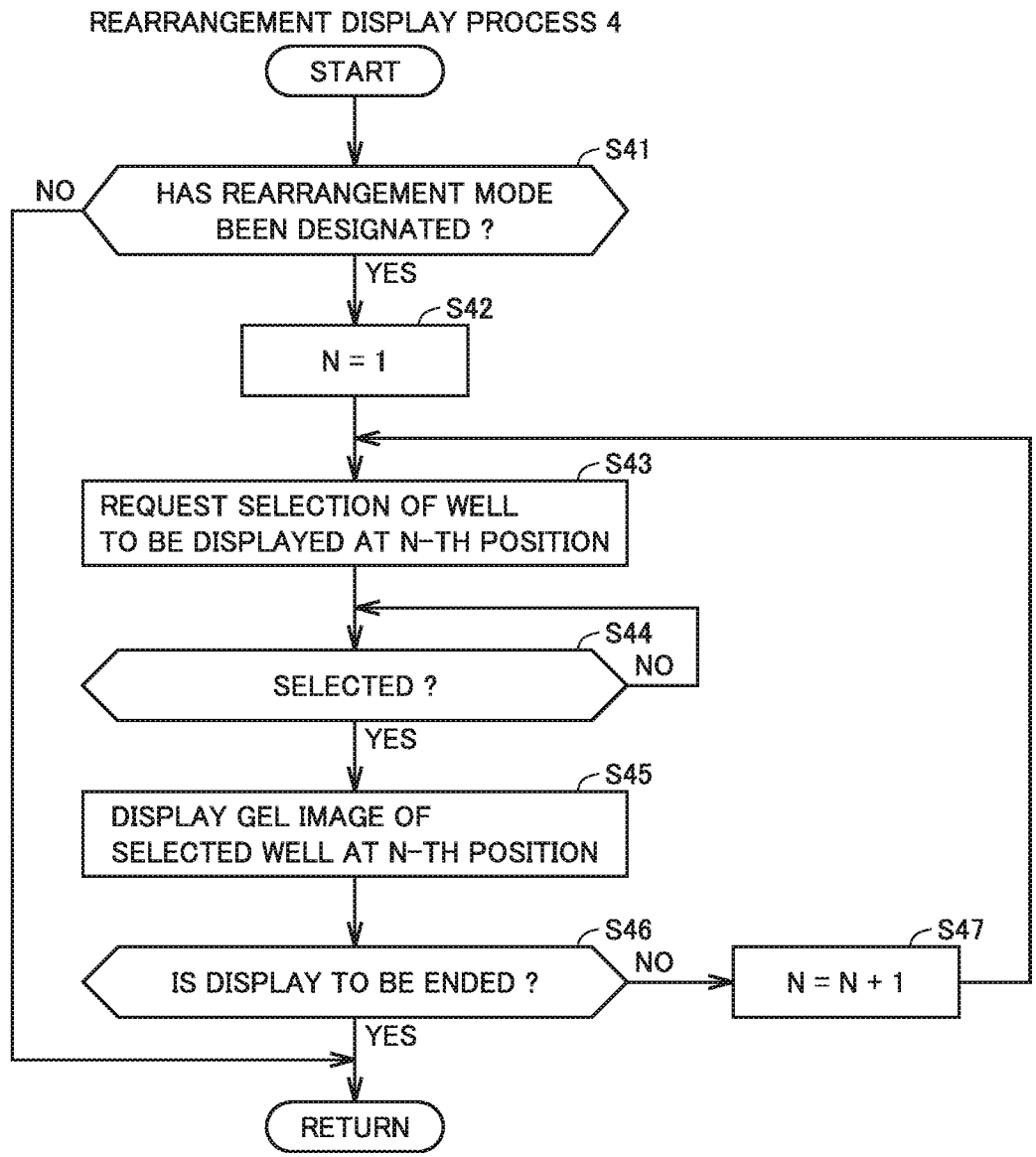
FIG. 13 is a flowchart for illustrating the rearrangement process performed when designating the order of arrangement by clicking.

FIG. 13 is a flowchart for illustrating the rearrangement process performed when designating the order of arrangement by clicking. First, in step S41, CPU 11 determines whether a rearrangement mode has been designated or not. For example, when a rearrangement button corresponding to window 142 has been selected, CPU 11 determines that the rearrangement mode has been selected.

When the rearrangement mode has been selected (YES in S41), then in step S42, CPU 11 sets a variable N at 1. Variable N indicates the position of a gel image to which the position of a well is referred. Then, in step S43, CPU 11 requests the user to select a well to be displayed at the N-th position. In step S44, CPU 11 waits for the user to select the well by clicking a mouse.

When CPU 11 detects selection of the well by the user in step S44, then in step S45, CPU 11 arranges the gel image in the selected well at the N-th position in order of arrangement in window 142, and rearranges the positions of the original N-th and subsequent gel images. Then, in step S46, CPU 11 determines whether or not to end display of the rearrangement.

For example, when N has reached the number of analysis samples, or when the user has input an instruction to end rearrangement, then in step S46, CPU 11 determines to end display of the rearrangement.

When it is determined not to end display of the rearrangement (NO in S46), CPU 11 adds 1 to variable N, and again executes the process in step S43 and subsequent steps.

When the number of times of rearrangement is relatively small, rearrangement by a drag-and-drop operation is convenient. However, for example, when the number of times of rearrangement is relatively large and when the gel images need to be entirely rearranged sequentially from the first gel image, designation of the order of arrangement by clicking is convenient since it is not necessary to designate destinations one by one.

[Process of Rearrangement in Order of Groups]

Conventionally, in software for analyzing and displaying data measured by electrophoresis, the measured data is displayed in the form of an electropherogram, a gel image, or the like, and also, a peak is detected to output the time, the size, the area, the concentration, the molar concentration, and the like related to the detected peak. Further, there is also a type of software that creates an arbitrary conditional expression using the result of detecting such a peak and classifies data using this conditional expression (for example, see Japanese Patent Laying-Open No. 2020-76613).

In the classification process performed as described above, it is convenient to grasp the tendency of the entire analysis samples if the gel images of the samples classified into the same group can be readily rearranged and displayed in ascending or descending order of number of samples belonging to the group.

Figure 14:
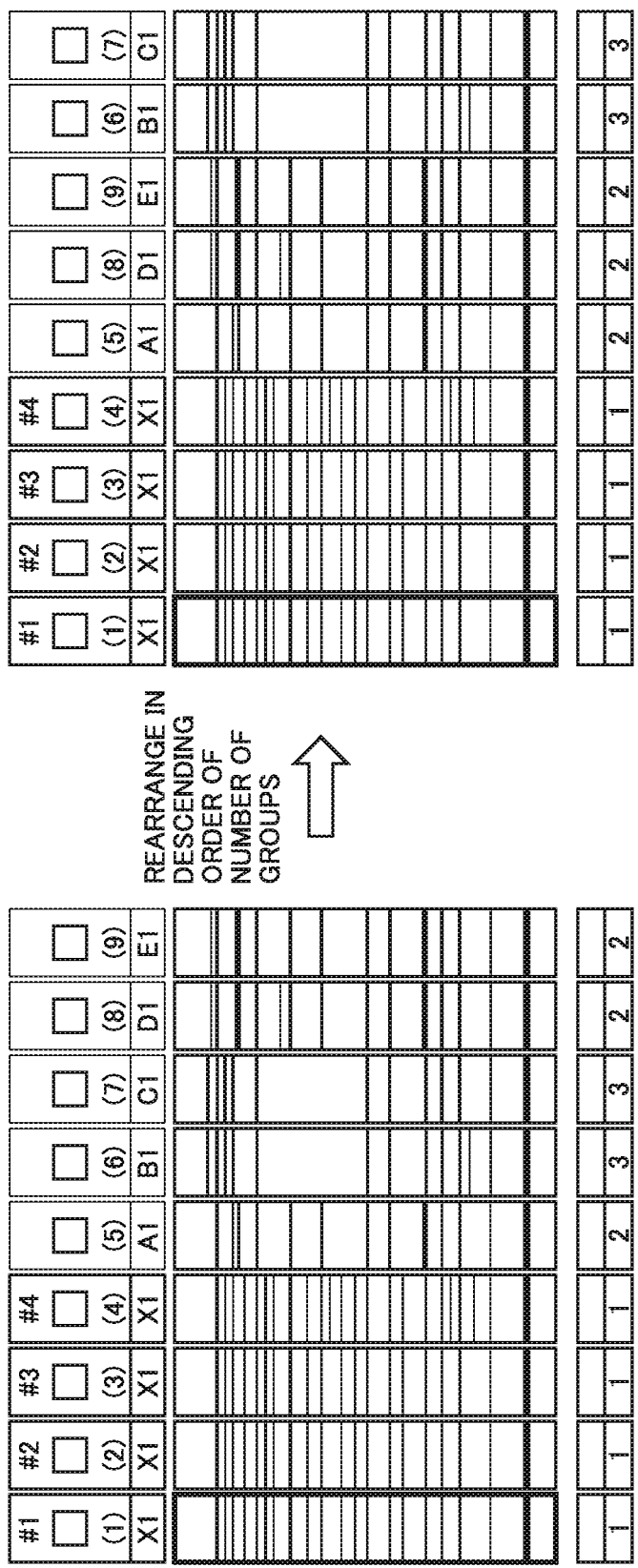
FIG. 14 is a diagram for illustrating rearrangement in order of groups (in descending order of number of samples).

FIG. 14 is a diagram for illustrating rearrangement in order of groups (in descending order of number of samples). In the arrangement in the initial state on the left side, a classification process is performed, and the groups into which the samples of gel images are classified are shown below the respective gel images. The example in FIG. 14 shows that wells X1 (the order of analysis 1 to 4) are classified into group 1; well A1 (the order of analysis 5), well D1 (the order of analysis 8) and well E1 (the order of analysis 9) are classified into group 2; and well B1 (the order of analysis 6) and well C1 (the order of analysis 7) are classified into group 3.

When the user designates rearrangement of the groups in descending order of number of samples (in order of descending number of samples) in this state, the arrangement is changed such that the gel images in window 142 are arranged in order of group 1, group 2, and group 3 as shown on the right side in FIG. 14.

Figure 15:
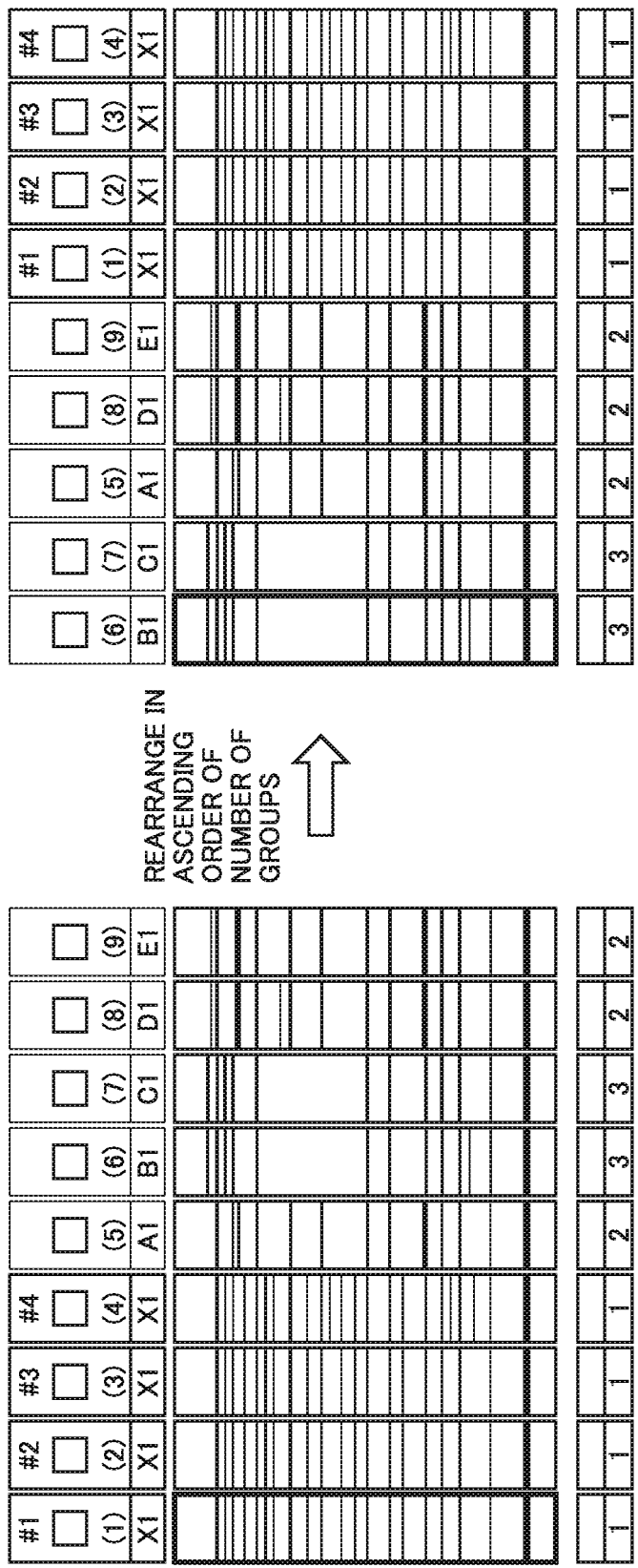
FIG. 15 is a diagram for illustrating rearrangement in order of groups (in ascending order of number of samples).

FIG. 15 is a diagram for illustrating rearrangement in order of groups (in ascending order of number of samples). Since the arrangement in the initial state on the left side in FIG. 15 is the same as that in FIG. 14, the description thereof will not be repeated.

When the user designates rearrangement of the groups in ascending order of number of samples (in order of ascending number of samples) in this state, the arrangement is changed such that the gel images in window 142 are arranged in order of group 3, group 2, and group 1 as shown on the right side in FIG. 14.

Figure 16:
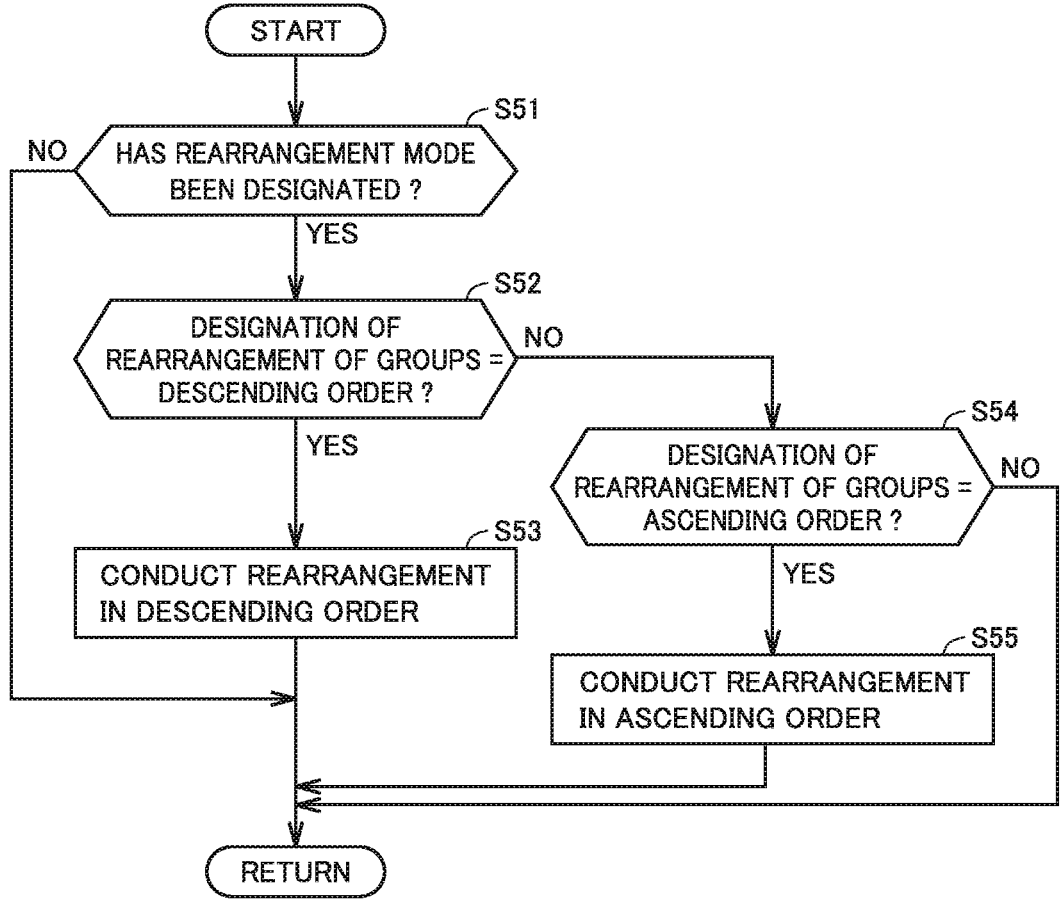
FIG. 16 is a flowchart for illustrating the rearrangement process performed when conducting rearrangement in order of groups.

FIG. 16 is a flowchart for illustrating the rearrangement process performed when conducting rearrangement in order of groups. First, in step S51, CPU 11 determines whether the rearrangement mode has been designated or not. For example, when a rearrangement button corresponding to window 142 has been selected, CPU 11 determines that the rearrangement mode has been selected.

Then, in step S52, CPU 11 determines whether or not rearrangement is designated in order of descending number of samples belonging to the respective groups (in descending order of number of samples). When the rearrangement is designated in order of descending number of samples (YES in S52), CPU 11 rearranges the gel images in descending order of number of samples as described with reference to FIG. 14 (S53).

When the rearrangement is designated not in order of descending number of samples (NO in S52), CPU 11 advances the process to step S54. In step S54, CPU 11 determines whether or not the rearrangement is designated in order of ascending number of samples belonging to the respective groups (in ascending order of number of samples). When the rearrangement is designated in order of ascending number of samples (YES in S54), CPU 11 rearranges the gel images so as to be arranged in ascending order of number of samples as described with reference to FIG. 15 (S55).

When the order of rearrangement is not designated in step S54 (NO in S54), CPU 11 returns the process to step S52.

[Aspects]

It will be understood by those skilled in the art that the above-described exemplary embodiments are specific examples of the following aspects.

(Clause 1) The first aspect of the present disclosure relates to a display process method for a plurality of pieces of data each obtained by electrophoresis separation for a corresponding one of a plurality of samples. The display process method includes: acquiring the plurality of pieces of data from a data file; arranging and displaying a plurality of gel images in a predetermined order, the plurality of gel images corresponding to the acquired plurality of respective pieces of data; making an inquiry to a user as to whether or not to rearrange and display the plurality of gel images in order of display, the order of display being different from the predetermined order; and rearranging and displaying the plurality of gel images in the order of display.

According to the display process method in Clause 1, for example, the gel images displayed in order of analysis can be readily rearranged and displayed as required for review.

(Clause 2) In the display process method according to Clause 1, the plurality of samples are set in an electrophoresis separation apparatus in a state where the plurality of samples each are arranged in a corresponding one of a plurality of wells arranged in rows and columns on a plate. The plurality of pieces of data includes: a result obtained by performing electrophoresis separation for each of the plurality of samples by the electrophoresis separation apparatus; and positional information about the plurality of wells corresponding to the plurality of respective samples. In the order of display different from the predetermined order, the plurality of gel images are arranged in one of numerical order of the rows and numerical order of the columns in which the plurality of wells are arranged.

According to the display process method in Clause 2, in the case where a plurality of samples are arranged in a plate, even when the samples to be arranged in rows are arranged erroneously in columns and the samples to be arranged in columns are arranged erroneously in rows, and the samples are analyzed in an undesired order, gel images still can be readily rearranged in a desired order.

(Clause 3) In the display process method according to Clause 2, in the predetermined order, the plurality of gel images are arranged in numerical order of the plurality of wells arranged in the other of the numerical order of the rows and the numerical order of the columns, the other of the numerical order of the rows and the numerical order of the columns being different from the one of the numerical order of the rows and the numerical order of the columns.

According to the display process method in Clause 3, in the case where a plurality of samples are arranged in a plate, the rearrangement operation need to be performed only when the samples arranged in a predetermined order are arranged not in a desired order. Thus, the user's time and effort for the operation can be reduced.

(Clause 4) In the display process method according to Clause 1, the rearranging and displaying includes: selecting one gel image from the plurality of gel images arranged and displayed in the predetermined order; and designating a position at which the selected one gel image is inserted into the plurality of gel images arranged and displayed in the predetermined order.

According to the display process method in Clause 4, even when the order of analysis is not a desired order, the gel images can be rearranged in the desired order in a simple operation such as a drag-and-drop operation or an operation of clicking a destination and a target to be moved.

(Clause 5) In the display process method according to Clause 1, N is defined as a natural number, and the rearranging and displaying includes: selecting one gel image to be displayed at an N-th position from the plurality of gel images arranged and displayed in the predetermined order; and inserting the selected one gel image at the N-th position of the plurality of gel images arranged and displayed in the predetermined order, and updating a display.

According to the display process method in Clause 5, the user does not need to designate the positions of the gel images after rearrangement one by one, which simplifies the operation required for rearrangement, with the result that the user's time and effort can be reduced.

(Clause 6) In the display process method according to Clause 1, separation data of the plurality of samples includes: order in which the plurality of samples are analyzed; and a result of grouping based on a peak position of an electropherogram. In the predetermined order, the plurality of gel images are arranged based on the order in which the plurality of samples are analyzed. In the order of display different from the predetermined order, the plurality of gel images are arranged in numerical order of groups that are obtained as a result of the grouping.

According to the display process method in Clause 6, the user does not need to designate the positions of the gel images after rearrangement one by one, which simplifies the operation required for rearrangement, with the result that the user's time and effort can be reduced.

(Clause 7) The display process method according to any one of Clauses 2 to 6, further including adding the order of display to the data file, the order of display being different from the predetermined order.

According to the display process method in Clause 7, the order of display after rearrangement by the user is stored separately from the standard order of arrangement, and thus, the user can immediately see the gel images arranged in an appropriate order when data is read from the file again.

(Clause 8) A data analysis apparatus according to another aspect of the present disclosure includes: a storage unit in which the data file is stored; a processor that executes the display process method according to any one of Clauses 1 to 7, and a display unit that displays the plurality of gel images.

(Clause 9) A non-transitory computer readable medium storing a program according to another aspect of the present disclosure causes a computer to execute the display process method according to any one of Clauses 1 to 6.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A display process method for a plurality of pieces of data each obtained by electrophoresis separation for a corresponding one of a plurality of samples, the display process method comprising:
    acquiring the plurality of pieces of data from a data file;
    arranging and displaying a plurality of gel images in a predetermined order, the plurality of gel images corresponding to the acquired plurality of respective pieces of data;
    displaying well images corresponding to an arrangement of wells in a sample plate;
    making an inquiry to a user as to whether or not to rearrange and display the plurality of gel images in order of display, the order of display being different from the predetermined order; and
    rearranging and displaying the plurality of gel images in the order of display based the user's rearrangement of the well images.

2. The display process method according to claim 1, wherein
    the plurality of samples are set in an electrophoresis separation apparatus in a state where the plurality of samples each are arranged in a corresponding one of a plurality of wells arranged in rows and columns on a plate, the plurality of pieces of data includes
a result obtained by performing electrophoresis separation for each of the plurality of samples by the electrophoresis separation apparatus, and
positional information about the plurality of wells corresponding to the plurality of respective samples, and
in the order of display different from the predetermined order, the plurality of gel images are arranged in one of numerical order of the rows and numerical order of the columns in which the plurality of wells are arranged.

3. The display process method according to claim 2, wherein, in the predetermined order, the plurality of gel images are arranged in the other of the numerical order of the rows and the numerical order of the columns, the other of the numerical order of the rows and the numerical order of the columns being different from the one of the numerical order of the rows and the numerical order of the columns.

4. The display process method according to claim 2, further comprising adding the order of display to the data file, the order of display being different from the predetermined order.

5. The display process method according to claim 1, wherein
the rearranging and displaying includes
selecting one gel image from the plurality of gel images arranged and displayed in the predetermined order, and
designating a position at which the selected one gel image is inserted into the plurality of gel images arranged and displayed in the predetermined order.

6. The display process method according to claim 1, wherein
N is defined as a natural number, and
the rearranging and displaying includes
selecting one gel image to be displayed at an N-th position from the plurality of gel images arranged and displayed in the predetermined order, and
inserting the selected one gel image at the N-th position of the plurality of gel images arranged and displayed in the predetermined order, and updating a display.

7. The display process method according to claim 1, wherein
separation data of the plurality of samples includes
order in which the plurality of samples are analyzed, and
a result of grouping based on a peak position of an electropherogram,
in the predetermined order, the plurality of gel images are arranged based on the order in which the plurality of samples are analyzed, and
in the order of display different from the predetermined order, the plurality of gel images are arranged in numerical order of groups that are obtained as a result of the grouping.

8. A non-transitory computer readable storage medium storing a program that when executed by a computer, causes a computer to execute the display process method according to claim 1.

9. A data analysis apparatus comprising:
a storage unit in which the data file is stored;
a processor configured to operate as instructed by the program code, the program code including:
acquiring the plurality of pieces of data from a data file;
arranging and displaying a plurality of gel images in a predetermined order based on the order of analysis of the plurality of samples, the plurality of gel images corresponding to the acquired plurality of respective pieces of data;
making an inquiry to a user as to whether or not to rearrange and display the plurality of gel images in order of display, the order of display being different from the predetermined order, including options to rearrange based on numerical order of rows or columns; and
displaying the plurality of gel images in the order of display, including rearranging in ascending order of row precedence or column precedence; and
a display unit that displays the plurality of gel images.

10. A display process method for a plurality of pieces of data each obtained by electrophoresis separation for a corresponding one of a plurality of samples, the display process method comprising:
acquiring the plurality of pieces of data from a data file;
arranging and displaying a plurality of gel images in a predetermined order, the plurality of gel images corresponding to the acquired plurality of respective pieces of data;
making an inquiry to a user as to whether or not to rearrange and display the plurality of gel images in order of display, the order of display being different from the predetermined order; and
rearranging and displaying the plurality of gel images in the order of display; wherein
separation data of the plurality of samples includes
order in which the plurality of samples are analyzed, and
a result of grouping based on a peak position of an electropherogram,
in the predetermined order, the plurality of gel images are arranged based on the order in which the plurality of samples are analyzed, and
in the order of display different from the predetermined order, the plurality of gel images are arranged in numerical order of groups that are obtained as a result of the grouping.

* * * * *